United States Patent [19]
Al-Sugair et al.

[11] Patent Number: 5,557,031
[45] Date of Patent: Sep. 17, 1996

[54] USE OF ELECTRIC ARC FURNACE BY-PRODUCTS IN CONCRETE

[76] Inventors: Faisal H. Al-Sugair; Abdulaziz I. Al-Negheimish; Rajeh Z. Al-Zaid, all of Department of Civil Engineering, King Saud University, P.O. Box 800, Riyadh, 11421, Saudi Arabia

[21] Appl. No.: 319,114

[22] Filed: Oct. 6, 1994

[51] Int. Cl.$^6$ .................... A62D 3/00; C04B 7/19
[52] U.S. Cl. .................... 588/257; 588/252; 588/901; 106/697; 106/705; 106/707
[58] Field of Search .................... 588/252, 257, 588/901, 256; 405/128, 129, 266; 106/697, 707, 705, 716, 769, DIG. 1

[56] References Cited

U.S. PATENT DOCUMENTS

| | | | |
|---|---|---|---|
| 4,432,666 | 2/1984 | Frey et al. | 405/129 |
| 4,840,671 | 6/1989 | Lynn et al. | |
| 4,911,757 | 3/1990 | Lynn et al. | |
| 5,130,051 | 7/1992 | Falk | 252/315.5 |
| 5,245,122 | 9/1993 | Smith | 588/206 |
| 5,259,697 | 11/1993 | Allen et al. | 405/129 |
| 5,332,041 | 7/1994 | Onan et al. | 166/295 |
| 5,387,740 | 2/1995 | Sasae et al. | 588/257 |

OTHER PUBLICATIONS

"Recycling of Electric Arc Furnace Dust", Sresty, G., HWRIC RR–046, Hazardous Waste Research and Information Center, Illinois, U.S.A., 1990.

MacRay, D. R., "Electric Arc Furnace Dust Disposal Recycle and Recovery", CMP Report No. 85–2, Centers for Metals Production, Pittsburgh, U.S.A., 1985.

Higley, L. W., Jr., and Fine, M. M., "Electric Furnace Steelmaking Dusts—A Zinc Raw Material", Report No. 8209, U.S. Bureau of Mines, Washington, D.C. 1977.

*Primary Examiner*—George A. Suchfield
*Attorney, Agent, or Firm*—William J. Spatz; Fred A. Keire

[57] ABSTRACT

Improved concrete or mortar materials wherein cement in the precursors for these is replaced by electric arc furnace dust in amounts from 0+% to 4% or more based on the amount of cement by weight. In addition, the electric arc furnace dust can be used as an additive to obtain the same effect.

8 Claims, 14 Drawing Sheets

USE OF ELECTRIC ARC FURNACE BY-PRODUCTS IN CONCRETE

This invention pertains to utilization of by-products from steel making particularly when employing an electric arc furnace for that purpose. More particularly this invention relates to the utilization of electric arc furnace dust as a partial replacement or additive for cement. Still further, this invention relates to the use of electric arc furnace by-products whereby electric arc furnace dust such as obtained in a bag house for it, may be used as replacement for cement if properly utilized and properly incorporated in a concrete precursor combination. The present invention provides set retardation and enhanced properties including corrosion inhibiting to the concrete end product. Set retardation in concrete is a desired property in situations where concrete is transported for fairly long distances especially in hot weather. It is also desired whenever concrete is required to remain in a fluid state for prolonged time periods. Additionally, this invention relates to utilization of electric arc furnace dust in climatic conditions especially conducive for producing good quality concrete while affording a vehicle for proper disposal of an environmentally unattractive product.

BACKGROUND FOR THE INVENTION

Electric arc furnace dust (hereinafter "EAF dust") is produced by the steel industry and on a rough basis is classified into two major categories. One category is dust which is produced from steel mills and the other is dust which is produced from steel foundries. Typically EAF dust is obtained in "bag houses" but other means to minimize dust emission may also be used such as cyclones and electrostatic precipitators and the like and the dust collected therein may be used in a similar manner.

In the United States EAF dust produced in steel mills has been classified under Resource Conversion and Recovery Act because of the presence of leachable lead and cadmium components. Consequently, the disposal problems which are associated with disposing EAF dust are sizeable and the costs exact a heavy burden on the steel industry. Because typically electric arc furnaces are being used when processing scrap metals and to a lesser degree sponge iron and the like, the consistency of EAF dust components may vary fairly radically and the control thereof is fairly difficult to maintain. Thus, components such as zinc and other metals are present in EAF dust. These components may vary widely and are difficult to control unless the entire dust load is mixed so as to disperse uniformly the various components from fairly numerous mill runs.

Although, a number of methods have been used to extract from EAF dust valuable components, e.g. zinc, a far simpler and more economically attractive method has been to utilize the by-product in its raw state. Even after the recovery of some of the metals from EAF dust the disposal problem is still present and, therefore, the disposal costs have to be taken into account in any Return-on-Investment (ROI) analysis when considering EAF dust produced from steel mills. An alternative for disposing EAF dust is to devise a properly sanctioned land disposal site or treat the EAF dust for stabilizing or encapsulating the component parts thereof and then disposing the stabilized mass in a suitable land disposal site.

With respect to the stabilized—encapsulated mass the added process steps and added cost consideration render the processing of EAF dust and the various component metals therein a difficult task and again penalizes any arc furnace operation.

BRIEF DESCRIPTION OF PRIOR ART

In considering the present invention, Applicants are aware of U.S. Pat. No. 5,245,122, which summarizes the typical prior art approach for chemically stabilizing electric arc furnace dust by entrapping the metals inherent in the EAF dust within a cementitiously sequestered product. The method includes using the pozzolanic characteristics of EAF dust forming a mixture of EAF dust with sufficient water and lime as necessary. The inventor alleges acceptable leachate resistance, permeability characteristics, and also unconfined compressive strength. The references mentioned in the above patent also provide a fairly complete discussion of prior art attempts in chemical stabilization of heavy metal bearing dusts and sludges.

EAF dust may also be obtained in the sludge form when it is recovered under wet conditions such as by wet scrubbing. Other background material which is found on utilization of electric arc furnace dust is found in the following references: Sresty, G., "*Recycling of Electric Arc Furnace Dust*", HWRIC RR-046 Hazardous Waste Research and Information Center, Ill., U.S.A., 1990; MacRay, D. R., "*Electric Arc Furnace. Dust Disposal Recycle and Recovery*", CMP Report No. 85-2, Center for Metals Production, Pittsburgh, U.S.A., 1985; and, Higley, L. W. Jr., and Fine, M. M. "*Electric Furnace Steelmaking Dusts—A Zinc Raw Material*" Report No 8209, U.S. Bureau of Mines, Washington, 1977.

Although it is known that small particles such as aggregate dust be added to cement for forming concrete, no disclosure has been found to use EAF dust as a property enhancer for Concrete much less as a specific property enhancer.

Dust of non-cement particles smaller than 300 μm in concrete mixtures was observed to enhance its workability and consequently its strength. ASTM Standards specifications states that the amount of particles smaller than 300 μm should constitute 10–30% of sand.

BRIEF DESCRIPTION OF THE INVENTION

It has now been found that EAF dust may be used as a partial replacement or additive for cement to provide set retardation and enhanced properties including corrosion inhibiting in concrete formation. Under appropriate conditions EAF dust confers enhanced properties to the concrete end product. As a result of the observed data, EAF dust may now be disposed in an environmentally more attractive manner. Moreover, benefits result not only from savings in cement usage, but also from savings in the operation of electric arc furnaces. Additional benefits are realized by minimizing EAF dust disposal problems.

In describing the invention, all percentages indicated are by weight. The basis for each calculation has been specified. In the discussion to follow the ASTM Standards have been employed wherever applicable or a different standard specified. The meaning for the test is not explained except where it is believed necessary.

DESCRIPTION OF DRAWINGS

When describing the present invention references will be made in the specification to various drawings which are for the most part self-explanatory and wherein.

DETAILED DESCRIPTION OF THE INVENTION AND EMBODIMENTS THEREOF

Figure 1:
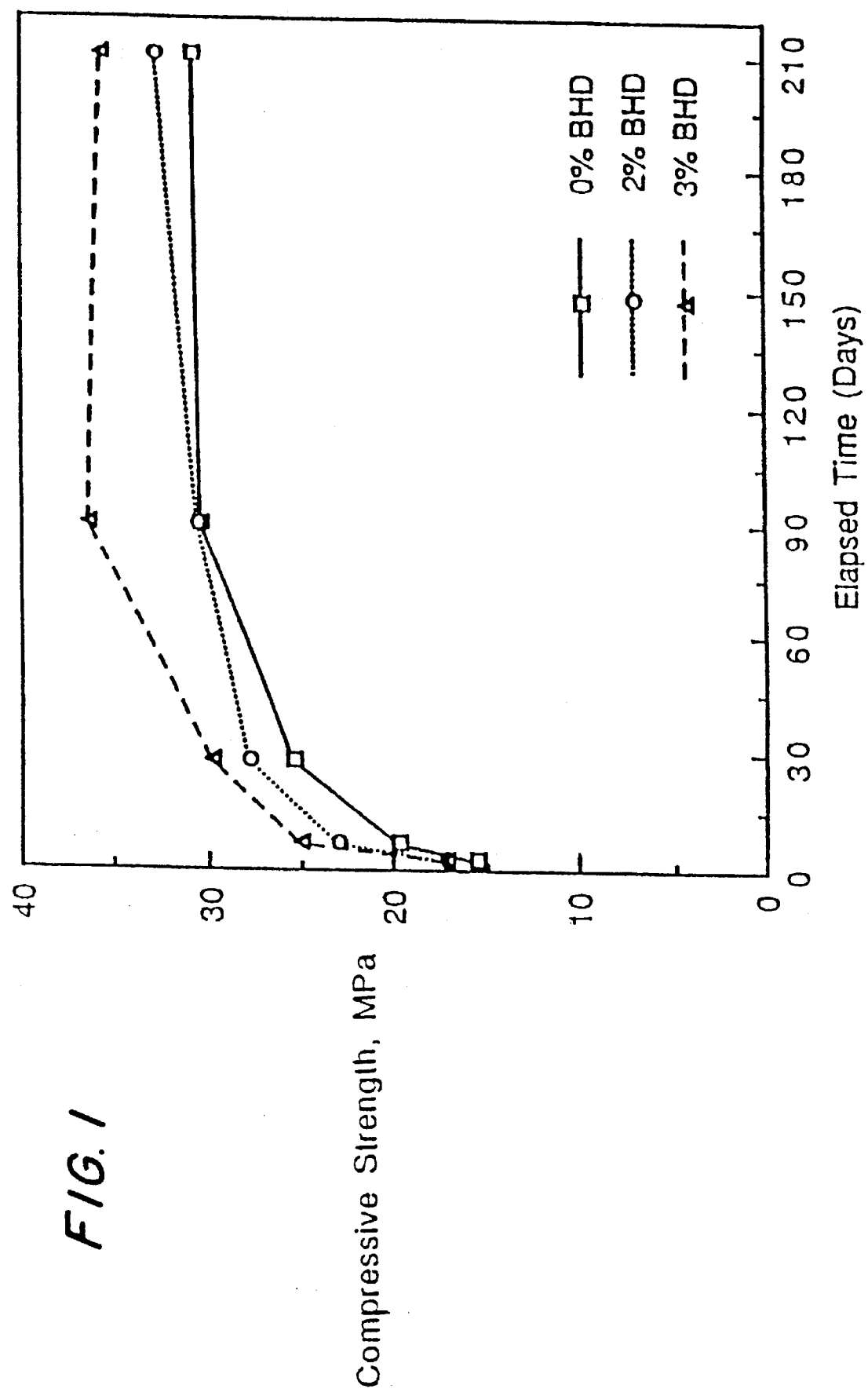
FIG. 1 illustrates a comparison of compressive strength of various concrete test products with bag house dust additions as specified and under specified curing conditions.

For describing the present invention, a few typical compositions of EAF dust from the USA is given in Table 1 below.

TABLE 1

Typical composition of EAF dust

Analysis, % by Weight

|  | Source A | Source B | Source C* |
|---|---|---|---|
| Iron | 35.0 | 32.8–72.9 | 29.6 |
| Chromium | 1.4 | 0.11–0.18 | — |
| Zinc | 3.1 | 3.9–10.3 | 26.4 |
| Lead | 0.93 | 2.1–2.4 | 2.6 |
| Cadmium | 0.04 | 0.04–0.06 | — |
| Calcium | 4.7 | 6.0–6.6 | 3.5 |
| Manganese | 6.2 | 3.5–5.4 | 3.5 |
| Magnesium | 3.7 | 1.6–2.1 | 1.8 |
| Sodium | 2.9 | 0.45–0.66 | 1.4 |
| Potassium | 0.94 | 0.8–1.0 | 0.8 |

TABLE 1-continued

Typical composition of EAF dust

Analysis, % by Weight

|  | Source A | Source B | Source C* |
|---|---|---|---|
| Aluminum | 0.40 | 0.22–0.35 | 0.2 |
| Copper | 0.20 | 0.1–0.2 | 0.3 |
| Silicon | 0 | 1.1–1.3 | 1.7 |

As it is evident from Table 1. various components are found in various proportions in these materials, however, the predominant components in common are iron and zinc.

TABLE 2

Analysis of samples from Company D used in Tests

Analysis, % by weight

| Element | Sample D1 | Sample D2 | Sample D3 | Sample D4 | Average |
|---|---|---|---|---|---|
| Aluminum (Al) | 0.71 | 0.66 | 0.69 | 0.74 | 0.70 |
| Calcium (Ca) | 9.41 | 9.28 | 9.30 | 9.56 | 9.39 |
| Cadmium (Cd) | 0.0004 | 0.0004 | 0.0004 | 0.0004 | 0.0004 |
| Copper (Cu) | 0.06 | 0.06 | 0.06 | 0.06 | 0.06 |
| Iron (Fe) | 33.5 | 33.3 | 33.7 | 33.9 | 33.6 |
| Potassium (K) | 1.73 | 1.60 | 1.68 | 1.77 | 1.70 |
| Magnesium (Mg) | 2.28 | 2.27 | 2.29 | 2.35 | 2.30 |
| Manganese (Mn) | 1.80 | 1.79 | 1.80 | 1.82 | 1.80 |
| Sodium (Na) | 2.48 | 2.63 | 2.62 | 2.54 | 2.57 |
| Nickel (Ni) | 0.01 | 0.01 | 0.01 | 0.01 | 0.01 |
| Lead (Pb) | 1.30 | 1.32 | 1.30 | 1.30 | 1.31 |
| Phosphorus (P) | 0.13 | 0.14 | 0.10 | 0.14 | 0.13 |
| Silicon (Si) | 2.43 | 2.34 | 2.32 | 2.41 | 2.38 |
| Tin (Sn) | 0.03 | 0.03 | 0.03 | 0.03 | 0.03 |
| Sulfur (S) | 0.59 | 0.58 | 0.56 | 0.56 | 0.57 |
| Titanium (Ti) | 0.09 | 0.08 | 0.08 | 0.09 | 0.09 |
| Zinc (Zn) | 10.7 | 10.8 | 10.7 | 10.7 | 1.7 |

As it is evident from the analyses above, there is some variety in the EAF dusts. However, the components which affect the properties of the final concrete product are sufficiently present such that the EAF dust may be used for the intended purpose with some adjustments made as are well known to those skilled in the art, e.g. relating to zinc and the so-called pozzolanic components thereof.

Three mixes with 0, 2 and 3 percent EAF bag house dust as replacement for cement were cast. The mix proportions are given in Table 3. Each mix was cast in two batches on two days. In Batch 1, specimens for compression test, and abrasion test were cast. Batch 2 casting consisted of specimens for compression test, splitting tensile strength test, time of setting test, and drying shrinkage measurement tests. Separate batches were cast for permeability test, corrosion tests, and heat of hydration tests.

TABLE 3

Mix Proportions in Kilograms per cubic meter

| Mix Designation | Cement | Water Free | Aggregates Coarse ⅜" | Aggregates Coarse ¾" | Sand | Bag house Dust (Company D) |
|---|---|---|---|---|---|---|
| Mix A | 350 | 217 | 390 | 730 | 715 | 0 |
| Mix B | 343 | 217 | 390 | 730 | 715 | 7 |
| Mix C | 339.5 | 217 | 390 | 730 | 715 | 10.5 |

Type 1 ordinary portland cement and surface dry aggregates were used. EAF bag house dust was obtained by mixing different containers of the type defined as Company DEAF dust and found described as such under EAF dust in Table 2 above. Reduction of sample size to one fourth was achieved by mechanical splitters. The sieve analysis of the mixed EAF dust is given in Table 4. The distribution of the dust reveals that over 98% of its particles pass a No. 50 sieve which has a diameter of 300 micrometers. Potable tap water was used as mixing water.

Mixing was carried out in 420 liter capacity mixer in accordance with ASTM C192-90. The EAF bag house dust was dispersed in the mixing water and thoroughly mixed.

TABLE 4

Sieve analysis of bag house dust

| Sieve Size | Percent passing |
|---|---|
| No. 4 | 100 |
| 8 | 100 |
| 16 | 99.9 |
| 30 | 99.7 |
| 50 | 98.7 |
| 100 | 69.4 |
| 200 | 9.0 |

Fineness Modulus = 0.32

Concrete temperature, slump and air contents of the fresh mix were measured. The results are summarized in Table 5.

TABLE 5

Summary of data obtained for various castings

| Mix Designation | Batch No. | Slump mm | Air Content % | Lab Temperature °C. | Concrete Temperature °C. |
|---|---|---|---|---|---|
| Mix A | 1 | 80 | <1 | 22 | 24 |
|  | 2 | 75 | <1 | 22 | 24 |
| Mix B | 1 | 110 | <1 | 22 | 24 |
|  | 2 | 110 | <1 | 22 | 24.5 |
| Mix C | 1 | 100 | <1 | 22 | 24 |
|  | 2 | 110 | <1 | 22 | 25 |

Initial and Final Setting Times

The results for the setting times are given in Table 6 below.

TABLE 6

Setting Time Determinations

| Mix Designation | Initial Setting Time Hrs:Min | | | | Final Setting Time Hrs:Min | | | |
|---|---|---|---|---|---|---|---|---|
| | Specimen 1 | Specimen 2 | Specimen 3 | Average | Specimen 1 | Specimen 2 | Specimen 3 | Average |
| Mix A | 3:54 | 3:52 | 3:52 | 3:53 | 5:45 | 5:41 | 5:43 | 5:43 |
| Mix B | 12:56 | 13:11 | 12:59 | 13:02 | 14:27 | 14:35 | 14:26 | 14:30 |
| Mix C | 32:17 | 32:12 | 32:11 | 32:11 | 33:57 | 33:48 | 33:53 | 33:53 |

From the above data it is evident that EAF dust addition increases set retardation and thus confers a valuable property to cement when formed into concrete.

A comparison of setting time results obtained at different times is given in Table 7. These results were obtained during the preliminary testing phase and later during the full scale testing phase. It is evident that the setting times exhibit a large variability even for Mix A with no dust.

TABLE 7

A comparison of setting times for preliminary investigation and full scale testing

| Mix Designation | Dust % | Setting Times Hrs:Min | | | |
|---|---|---|---|---|---|
| | | Preliminary Testing | | Full Scale Testing | |
| | | Initial | Final | Initial | Final |
| A | 0 | 5:26 | 7:47 | 3:53 | 5:43 |
| B | 2 | 10:25 | 12:14 | 13:02 | 14:30 |
| C | 3 | 22:26 | 24:03 | 32:13 | 33:53 |

As it is known, setting time is sensitive to any changes in moisture content or environmental conditions. Nevertheless, the trend is clear that at up to about a 2% EAF dust replacement for cement (Mix B) in concrete will give a reasonable effect.

Compressive Strength

To study the effect of EAF bag house dust replacement on compressive strength, 27 standard 5"×12"cylinders were cast in Batch 1 and 21 cylinders were cast in Batch 2 for each mix using company D bag house dust (BHD). Mix A and Mix B specimens were moist cured using burlap and polyethylene covers for 24 hours after casting, whereas Mix C specimens, due to their slow setting, were cured in a similar way for 48 hours. After initial moist curing, fifteen specimens were dried in each of the following three drying conditions:

1. Continuous under water curing (C1)

2. Average temperature and humidity room (C2) (30° C. and 50% relative humidity).

3. High temperature/Low humidity (C3) (55° C. and 5% relative humidity).

TABLE 8

Summary of Compressive Strength Test Results for Bag House Dust

| Age of Curing | | Compressive strength, MPa | | | | | | | | |
|---|---|---|---|---|---|---|---|---|---|---|
| | | Curing Condition C1 | | | Curing condition C2 | | | Curing condition C3 | | |
| Days | Specimen | Mix A | Mix B | Mix C | Mix A | Mix B | Mix C | Mix A | Mix B | Mix C |
| 3 | 1 | 15.2 | 15.6 | 14.5 | 15.4 | 18.0 | 16.0 | 15.7 | 17.0 | 18.5 |
| | 2 | 16.2 | 17.6 | 14.7 | 15.6 | 15.7 | 17.0 | 163 | 17.6 | 15.4 |
| | 3 | 15.4 | 18.2 | 16.2 | 15.2 | 16.1 | 15.8 | 15.6 | 18.2 | 18.1 |
| | Average | 15.6 | 17.2 | 15.2 | 15.4 | 16.6 | 16.5 | 15.9 | 17.6 | 17.4 |
| 7 | 1 | 18.8 | 22.9 | 242 | 18.6 | 22.5 | 23.5 | 15.1 | 18.9 | 21.2 |
| | 2 | 20.3 | 23.7 | 24.3 | 19.5 | 21.8 | 243 | 19.4 | 19.4 | 17.6 |
| | 3 | 20.3 | 22.2 | 26.6 | 19.1 | 22.4 | 26.4 | 17.4 | 19.9 | 19.4 |
| | Average | 19.8 | 22.9 | 25.1 | 19.0 | 22.2 | 24.7 | 17.3 | 19.4 | 19.4 |
| 28 | 1 | 24.2 | 26.4 | 30.2 | 22.6 | 25.2 | 29.0 | 16.5 | 17.1 | 1&9 |
| | 2 | 25.8 | 27.5 | 29.8 | 19.1 | 27.2 | 27.0 | 17.7 | 189 | 18.5 |
| | 3 | 26.0 | 29.6 | 29.4 | 23.7 | 25.3 | 28.0 | 18.0 | 17.3 | 18.3 |
| | Average | 25.3 | 27.8 | 29.8 | 21.8 | 25.9 | 28.0 | 17.4 | 17,8 | 18.6 |
| 90 | 1 | 29.2 | 30.4 | 32.8 | 23.8 | 30.5 | 30.3 | 15.2 | 19.5 | 24.0 |
| | 2 | 30.9 | 28.7 | 35.4 | 24.2 | 30.0 | 32.3 | 17.4 | 18.0 | 21.3 |
| | 3 | 30.7 | 30.8 | 40.5 | 24.7 | 27.9 | 29.2 | 17.3 | 20.4 | 22.5 |
| | Average | 30.2 | 30.4 | 36.3 | 24.2 | 29.8 | 30.6 | 16.6 | 19.3 | 22.6 |
| 210 | 1 | 32.4 | 33.0 | 34.2 | 21.7 | 26.4 | 30.3 | 19.5 | 18.4 | 19.5 |
| | 2 | 28.8 | 33.8 | 34.9 | 23.9 | 30.6 | 37.3 | 17.2 | 16.7 | 25.7 |
| | 3 | 30.9 | 31.0 | 37.6 | 23.2 | 29.2 | 26.6 | 18.2 | 18.9 | 22.3 |
| | Average | 30.7 | 32.6 | 35.6 | 22.9 | 28.7 | 32.4 | 18.0 | 22.5 | |

Three identical cylinders from each mix and for each curing condition were tested in compression at 3, 7, 28, 90 and 210 days. The compression test was carried out in accordance with ASTM C39. The procedural results obtained are summarized in Table 8 above.

Figure 2:
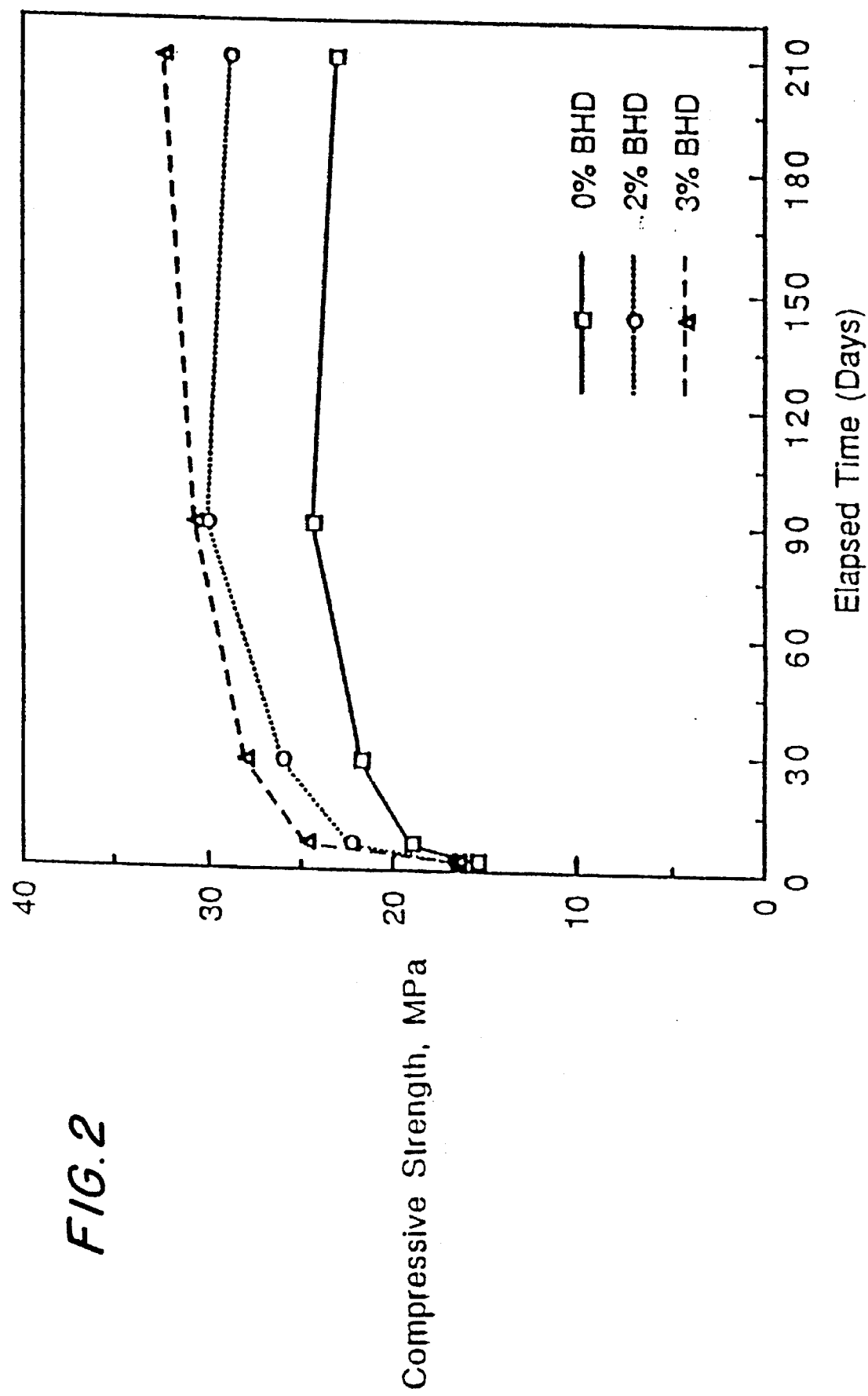
FIG. 2 illustrates the same property for the product as in FIG. 1 but at different specified curing conditions.
Figure 3:
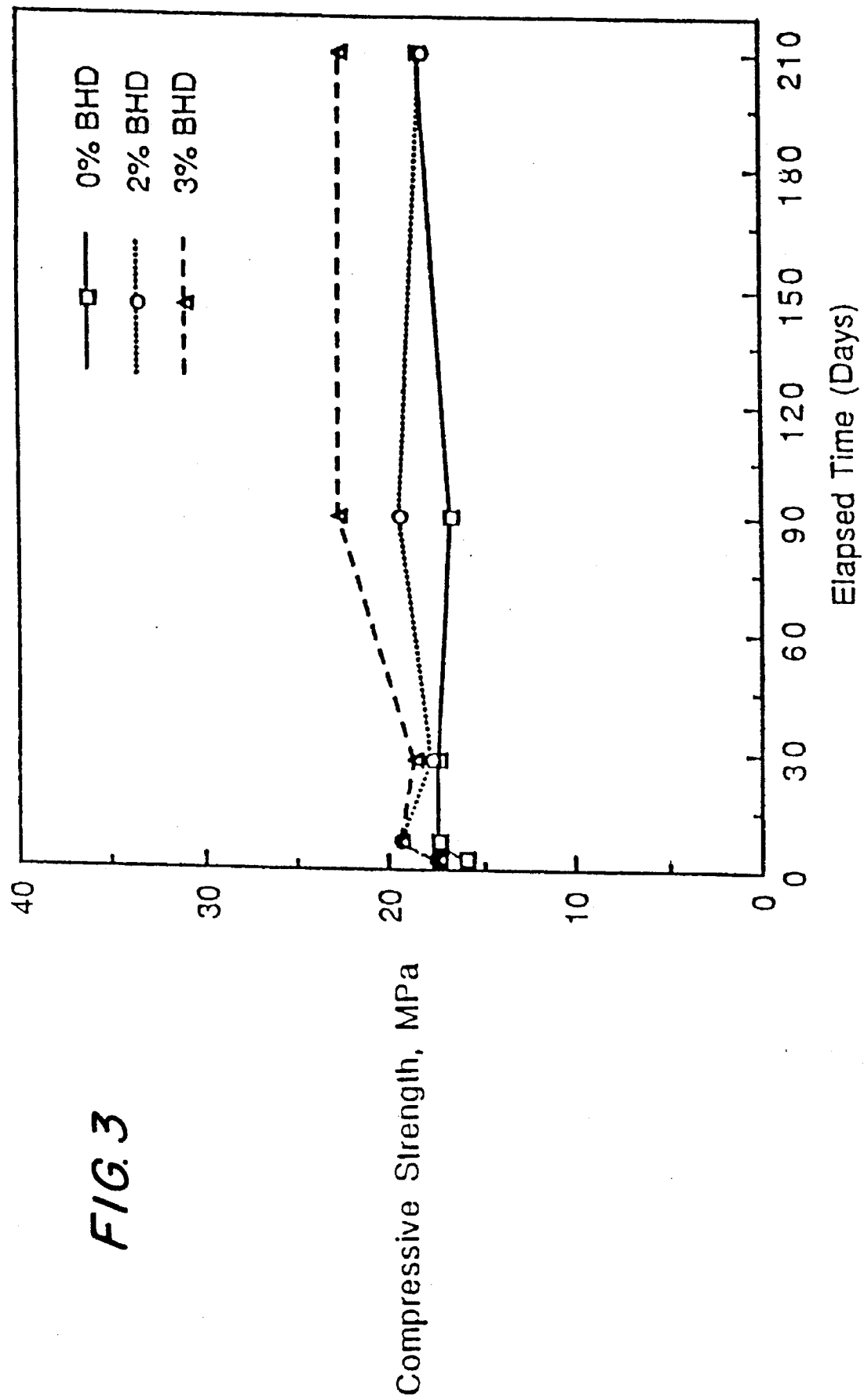
FIG. 3 illustrates the same property for the product as in FIG. 1 but at still different, specified curing conditions.

A comparison of compressive strengths of Mix A, Mix B and Mix C at various ages and for each curing condition is given in FIGS. 1, 2 and 3. Generally there is an increase in compressive strength of Mixes B and C relative to the control Mix A, at all ages.

To check the variability from batch-to-batch, three identical cylinders from each batch were cast and cured under condition C1 for 28 days and tested in compression. A comparison of compressive strengths is given in Table 9.

TABLE 9

Comparison of 28 day compressive strength for Batch 1 and Batch 2 Castings

| Mix Designation | Batch No. | Compressive Strength, MPa | | | |
|---|---|---|---|---|---|
| | | Specimen 1 | Specimen 2 | Specimen 3 | Average |
| Mix A | 1 | 24.2 | 25.8 | 26.0 | 25.3 |
| | 2 | 25.6 | 25.6 | 26.1 | 25.8 |
| Mix B | 1 | 26.4 | 27.5 | 29.6 | 27.8 |
| | 2 | 32.0 | 28.7 | 27.2 | 29.3 |
| Mix C | 1 | 30.2 | 29.8 | 29.4 | 29.8 |
| | 2 | 30.0 | 31.1 | 35.0 | 32.0 |

From FIGS. 1, 2, and 3 it is evident that there is an increase in compressive strength with the increase in percent of EAF bag house dust replacement from 0 to 3%. This increase is noticed at all ages of curing and for all curing conditions under study.

It is noticed that, for 3 days of curing the increase in strength obtained in case of Mix B (2% replacement) is greater than increase in strength obtained in case of Mix C (3% replacement). The difference is appreciable in case of curing condition C1. Specimens prepared from Mix C could be demolded only after 48 hours of moist curing (due to slow setting) whereas Mix A and Mix B specimens were demolded after 24 hours of moist curing and shifted to desired curing conditions. The difference in setting (and the respective measurements before full "cure") is the main reason for the reduction in strength obtained in Mix C specimens as compared to Mix B specimens at the age of 3 days.

From these results it is observed that the replacement of cement by dust did not show any adverse effects under the three curing conditions studied from point of view of compressive strength up to 210 days of testing. In fact, specimens containing the dust showed an increase in compressive strength.

Splitting Tensile Strength

Figure 7:
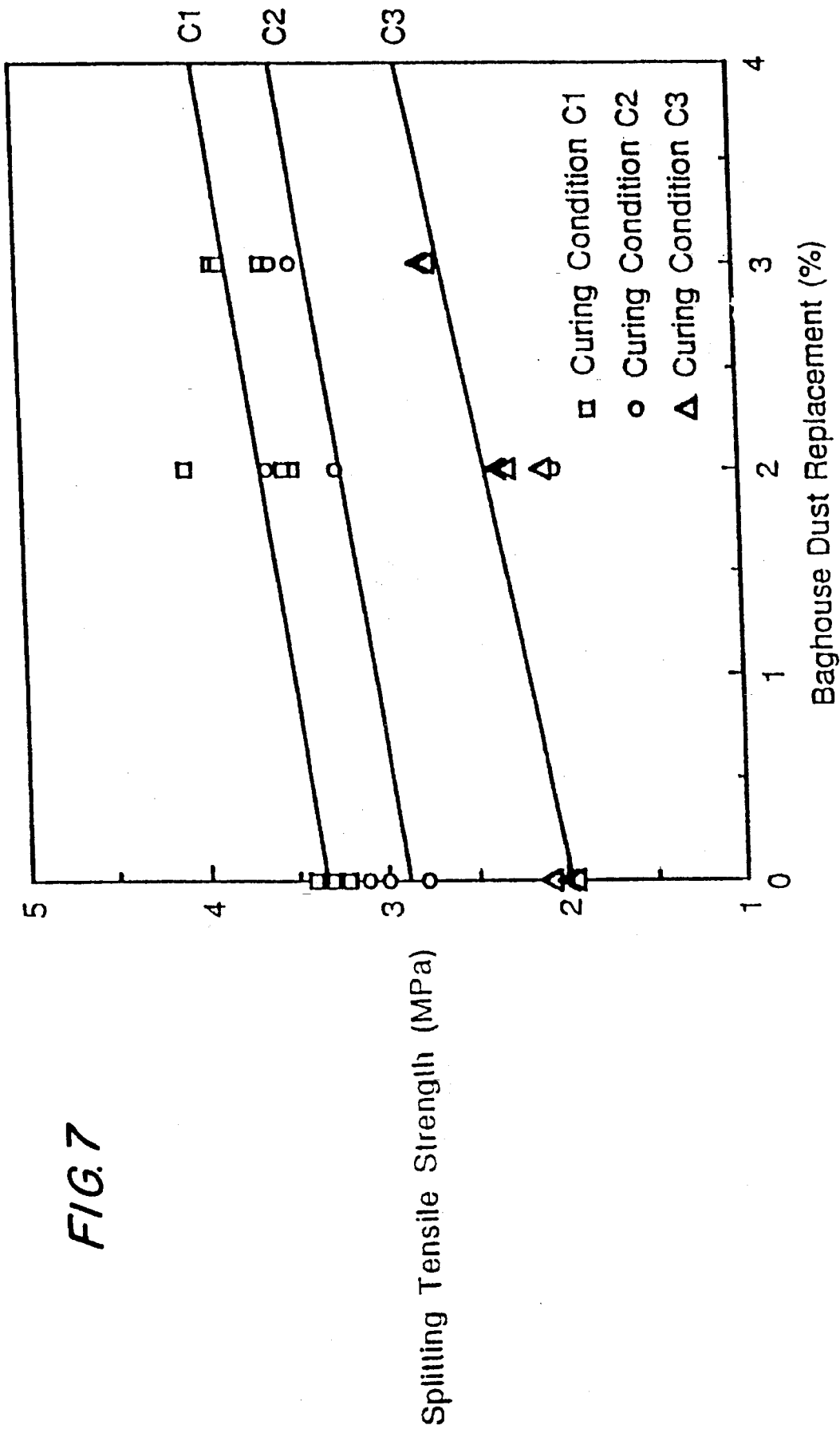
FIG. 7 illustrates a graph for the HCP (half cell potential) test for reinforced concrete product test specimens at different BHD replacement percentages and specified curing conditions.

For this test, 9 standard 6"×12" cylinders were cast from each mix in Batch 2 castings. After casting, the cylinders were moist cured using burlap and polyethylene covers for 24 hours, except in the case of Mix C, where the specimens were moist cured for 48 hours due to its slow setting. After initial moist curing, three specimens from each mix were dried for 28 days under the three curing conditions C1, C2 and C3. At the end of curing period, splitting tensile strength test was carried out in accordance with ASTM C496-90. Table 10 shows the splitting tensile strength results for Mix A, Mix B and Mix C for curing conditions C1, C2 and C3. Effect of EAF bag house dust replacement of cement on splitting tensile strength for various curing conditions is depicted in FIG. 7.

TABLE 10

Splitting tensile strength test results

| Mix Designation | Compressive Strength, MPa | | | | Curing condition |
|---|---|---|---|---|---|
| | Specimen 1 | Specimen 2 | Specimen 3 | Average | |
| Mix A | 3.2 | 3.4 | 3.3 | 3.3 | C1 |
| | 2.8 | 3.0 | 3.1 | 3.0 | C2 |

TABLE 10-continued

Splitting tensile strength test results

| Mix Designation | Compressive Strength, MPa | | | | Curing condition |
|---|---|---|---|---|---|
| | Specimen 1 | Specimen 2 | Specimen 3 | Average | |
| | 2.1 | 2.0 | 2.0 | 2.0 | C3 |
| Mix B | 4.1 | 3.5 | 3.5 | 3.7 | C1 |
| | 3.3 | 3.6 | 3.0 | 3.3 | C2 |
| | 2.4 | 2.1 | 2.3 | 2.2 | C3 |
| Mix C | 3.9 | 3.9 | 3.6 | 3.80 | C1 |
| | 3.6 | 3.5 | 3.6 | 3.5 | C2 |
| | 2.9 | 2.8 | 2.7 | 2.7 | C3 |

Figure 4:
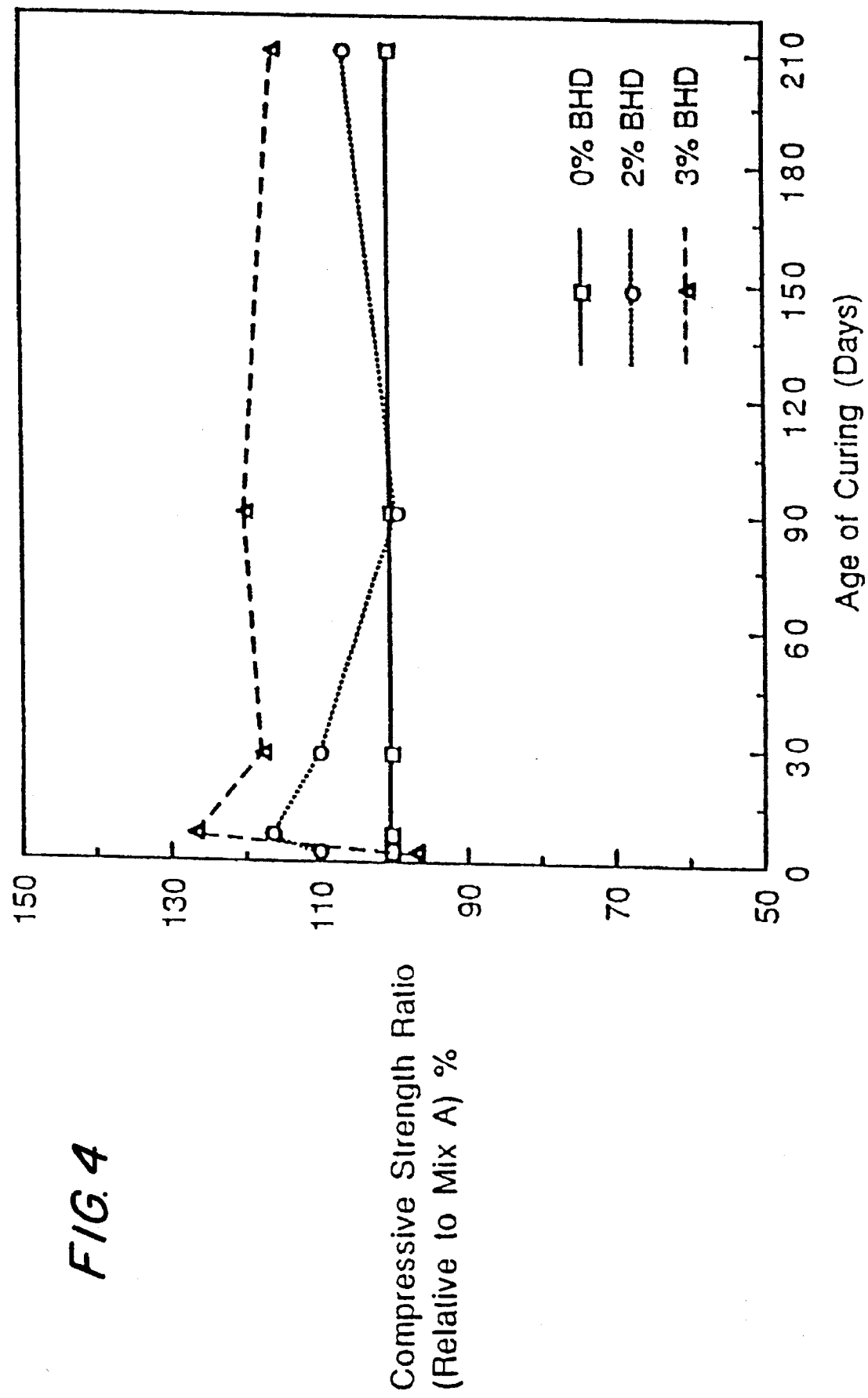
FIG. 4 illustrates the various amounts of bag house dust (BHD) as replacement for cement and the effect of the amount on splitting tensile strength for concrete specimens at different curing conditions.

From Table 10 and FIG. 4 it is seen that there is an increase in splitting tensile strength with the increase in percent of dust replacement from 0 to 3%. This increase is consistent for all the three curing methods used.

For 2% dust replacement the increase is about for curing conditions C1, C2 and C3 whereas for Mix C the increase is not less than 14%.

Abrasion Resistance

The results of the abrasion test are summarized in Table 11.

TABLE 11

Abrasion resistance of concrete by rotating-cutter method reflected by average weight loss after 4

| Curing Conditions | Mix A (gms lost) | Mix B (gms lost) | Mix C (gms lost) |
|---|---|---|---|
| C2 | 1.34 | 1.30 | 1.29 |
| C3 | 1.96 | 1.69 | 1.71 |

The results are in terms of the average weight loss in grams after applying the rotating-cutter for 4 minutes, and are an average of three test applications on three identical slabs. From the results it can be said that the mixes containing dust (B & C) are almost identical and are slightly better than Mix A with no dust.

Drying Shrinkage Measurements

For shrinkage measurements, 75×75×300 mm concrete prisms were cast and cured according to ASTM C157. For each mix, six prisms were cast and moist cured using burlaps and polyethylene covers for 24 hours. After 24 hours, the specimens were demolded and then placed in lime saturated water for 30 minutes before recording the initial comparator reading. In case of Mix C, the specimens were moist cured for 48 hours before demolding. After recording the initial comparator reading the specimens were cured in lime saturated water for 28 days. At the end of curing period a second comparator reading was made and three specimens each were left to dry in conditions C2 and C3 previously defined.

Weekly comparator readings of each specimen are made. Each reading is an average of two measurements (second measurement is made by reversing the specimen).

Figure 5:
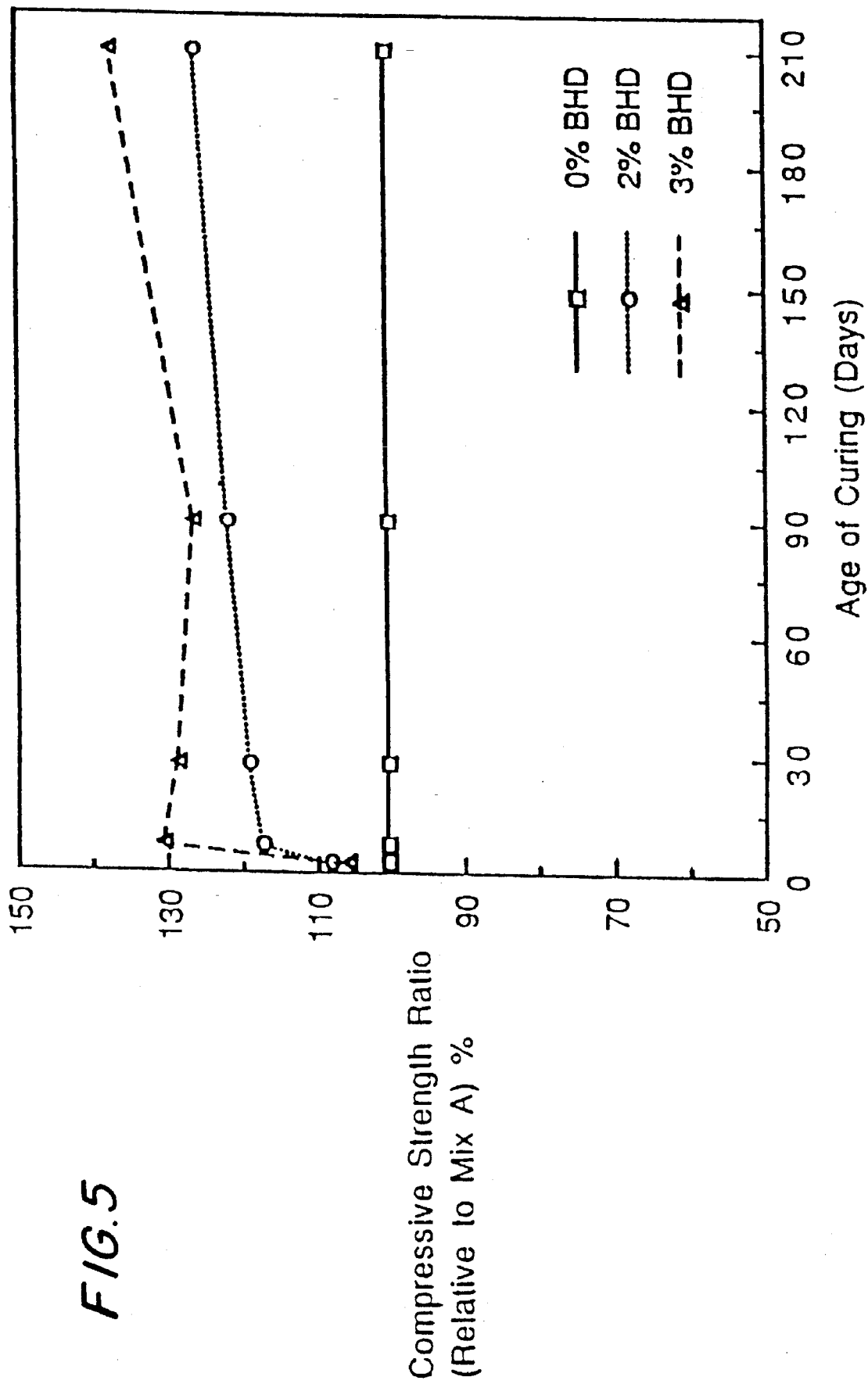
FIG. 5 illustrates the shrinkage strain of various test specimens with specified bag house dust content at the specified (C2) curing conditions.
Figure 6:
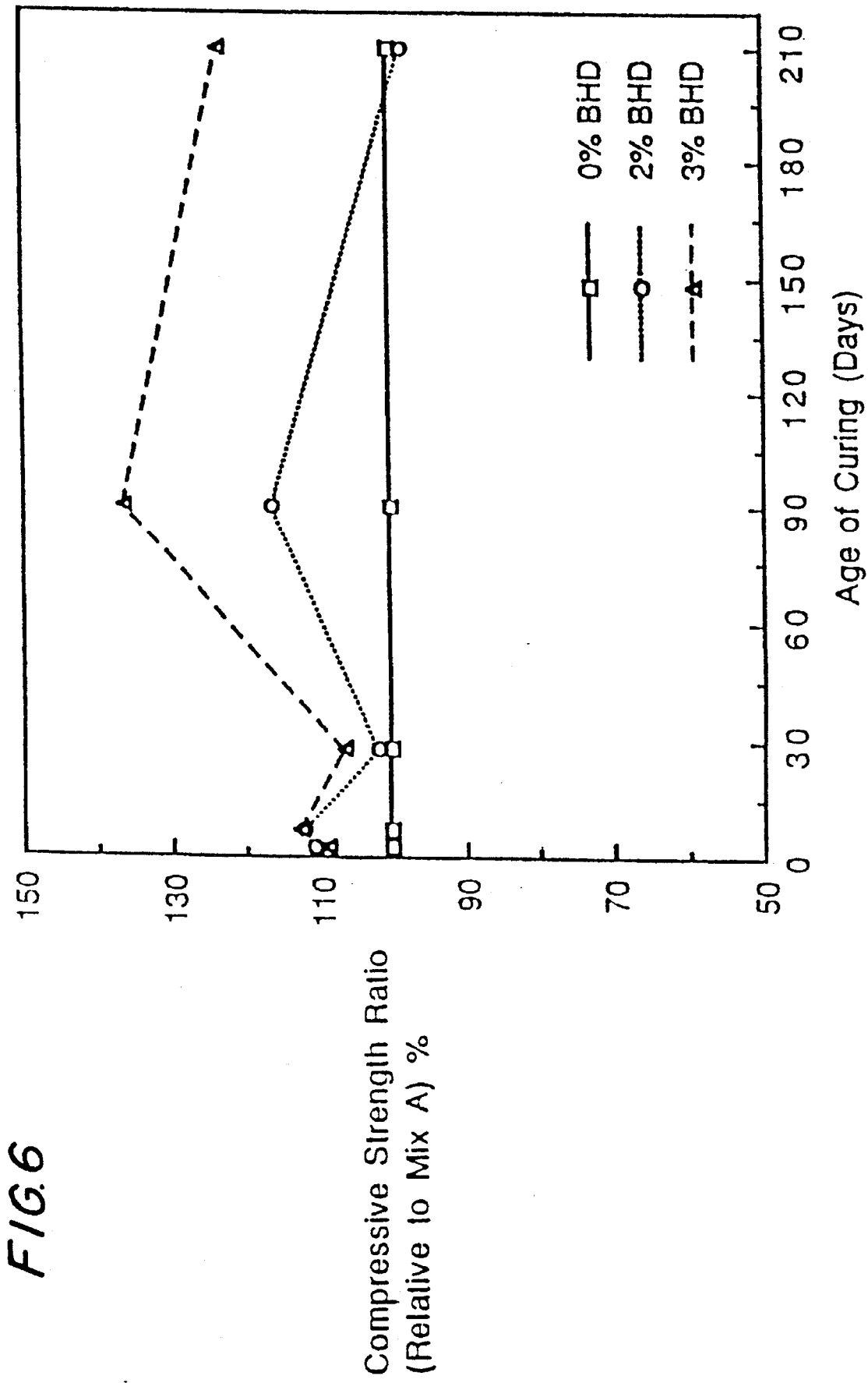
FIG. 6 illustrates the same properties for concrete as in FIG. 8 but at different curing conditions.

FIGS. 5 and 6 show a comparison of shrinkage strains for specimens with 0, 2, and 3% dust replacement stored in the C2 and C3 conditions. The results are shown as plots of shrinkage strains (computed as averages of the three identical specimens) versus log of elapsed time. For true shrinkage strains, FIG. 6 needs to be adjusted for temperature effects. The results show that, for the two curing conditions, Mix B with 2% dust replacement has lower shrinkage as compared to Mix A and Mix C. The shrinkage strains in case of Mix A and Mix C specimens seem to be of the same magnitude with little difference. The reason for higher shrinkage strains in case of Mix A specimens as compared to Mix B specimens is unclear.

Nevertheless, it can be concluded that dust replacement has no adverse effects from shrinkage point of view as compared to Mix A with no replacement.

Corrosion Monitoring

Several tests were conducted to obtain a complete picture of the corrosion of reinforcement in concrete containing bag house dust such as shown for company D. There are two main factors which must be considered in corrosion analysis of the concrete containing BHD:

1. The dust has pozzolanic characteristics. Generally this means that the dust goes through a secondary reaction with the calcium hydroxide generated from the primary cement and water reaction which produces hardened cement. This would reduce the alkalinity of the concrete thus creating a more favorable condition for corrosion to occur.

2. The dust contains zinc oxide (ZnO) which is known to inhibit corrosion.

The combination of the above two factors will result in a complicated corrosion process which is monitored by electrochemical techniques.

The following tests were conducted:

1. Measuring the pH values for mixes with and without dust.

2. Monitoring the half-cell potential in accordance with ASTM C876. The more negative the HCP value, the more corrosion activity is occurring in the specimen.

3. Measuring the polarization resistance following the method of Stern and Geary. The polarization resistance is inversely proportional to the corrosion rate. Therefore, the more its value the less the corrosion rate in the specimen.

The results are given below.

pH Values

For comparison, three mixes were used as follows:

Mix I: Cement+water in a ratio 2:1 by weight

Mix II: bag house dust+water in a ratio 2:1 by weight

Mix III: Cement+3% Dust replacement+aggregates+water as in Mix C of the full scale testing above.

TABLE 12 pH values determined for mixes with and without dust

| Mix | 1–10 Minutes from casting | 7 days of moist curing |
|---|---|---|
| I | 12.1 | 11.7 |
| II | 12.9 | 10.85 |
| III | 12.4 | 10.83 |

The pH values immediately after mixing (1–10 minutes) and after 7 days of moist curing are given in Table 12. The lower the pH value, the more favorable are the conditions for corrosion to occur.

The results indicate that Mix III containing 3% dust is better than Mix I with no dust immediately after casting. This is not true after 7 days since mixes II and III had lower pH values.

It was revealed that the bag house dust has some pozzolanic characteristics which means that some parts of the bag house dust react with the calcium hydroxide produced during the cement hydration process. This reduces the alkalinity of the environment hence reducing the pH values.

HCP for specimens

For the HCP test, 3 prisms 150×150×500 mm from each mix were cast in steel molds. Each prism had 2ϕ14 mm, 400 mm long reinforcing steel bars in it. The reinforcing steel was grade 60 steel and clear of rusting and chipping.

In placing the reinforcing bars special care was taken to assure that the positions of the bars within the concrete specimens, and the distance between the two bars, were the same for all specimens. For each prism, a concrete layer was placed to a height of 60 mm. This layer was levelled using a vibrator and then the two bars each with an insulated copper wire tied at the center of the bar were placed on top of the levelled layer. The bars were then positioned with the aid of a measuring tape and the copper wires were extended so as to remain out of the prism after the casting was completed. The remaining concrete was then poured to the height of the prism.

The specimens were cured for 28 days after casting in lime-saturated water then placed in a tank with 3.5% sodium chloride solution completely covering the specimens. The HCP values were measured versus a saturated calomel electrode once every week. After 186 days from casting, the specimens were raised to make them partially immersed. This was done to insure that the specimens got sufficient oxygen to sustain the corrosion process. The HCP results are shown in FIG. 7. The results show that the HCP for mix A starts out more than mixes B and C. After time passes, the HCP for mix A starts to decrease and that of mixes B and C increases. The results cross and finally the concrete with no dust (mix A) ends up with the lowest value of HCP. These results are consistent with the expected corrosion performance of bag house dust in concrete as discussed above.

It is postulated that during the early ages of specimens' exposure to sodium chloride solution that the pozzolanic characteristics of the BHD dominate the corrosion behavior and indicate that the specimens from mixes B and C have more corrosion activity than mix A. As time passes, the corrosion inhibiting characteristics of the dust, brought about by the ZnO, start to take a role and slow down (inhibit) the corrosion process in mixes B and C.

The above description is consistent with the results shown in FIG. 7.

Polarization resistance

The polarization resistance (RP) was measured on the same specimens used for the HCP at three different ages to verify the corrosion process and the utilization of bag house dust. The RP values measured are shown in Table 13. Also shown are the corrosion potential values, $E_{corr}$. The corrosion potential is theoretically the same as the HCP value measured previously.

TABLE 13

| | RP values for all specimens | | | | | |
|---|---|---|---|---|---|---|
| | RP ohm · cm$^2$ | | | $E_{corr}$ mV | | |
| Mix | 126 days | 277 days | 348 days | 126 days | 277 days | 348 days |
| A | 46719 | 48870 | 43736 | −450 | −477.3 | −481 |
| B | 23628 | 59014 | 47554 | −437.7 | −380.7 | −434.7 |
| C | 34189 | 59253 | 59786 | −402.7 | −368 | −391.7 |

The RP results indicate that the corrosion rate is higher after 126 days in the specimens containing bag house dust; this situation is changed with time as corrosion inhibition occurs.

In view of the HCP and RP results covering almost one year measurement, it can be said that the specimens containing bag house dust are at least as good as the regular concrete in terms of their corrosion characteristics.

Specimens stored in regular water

To further clarify the situation one more set of specimens from the mixes A, B, and C was cast. These specimens were cured in lime-saturated water and HCP measurements were taken starting after 28 days of curing without exposing the specimens to sodium chloride solution. The RP values were also measured after 68 and days had passed. It is expected that for specimens stored in such conditions, the pozzolanic activity will take place. However, since there is no corrosion activity occurring, the role of the corrosion inhibitant will not be observed.

Figure 8:
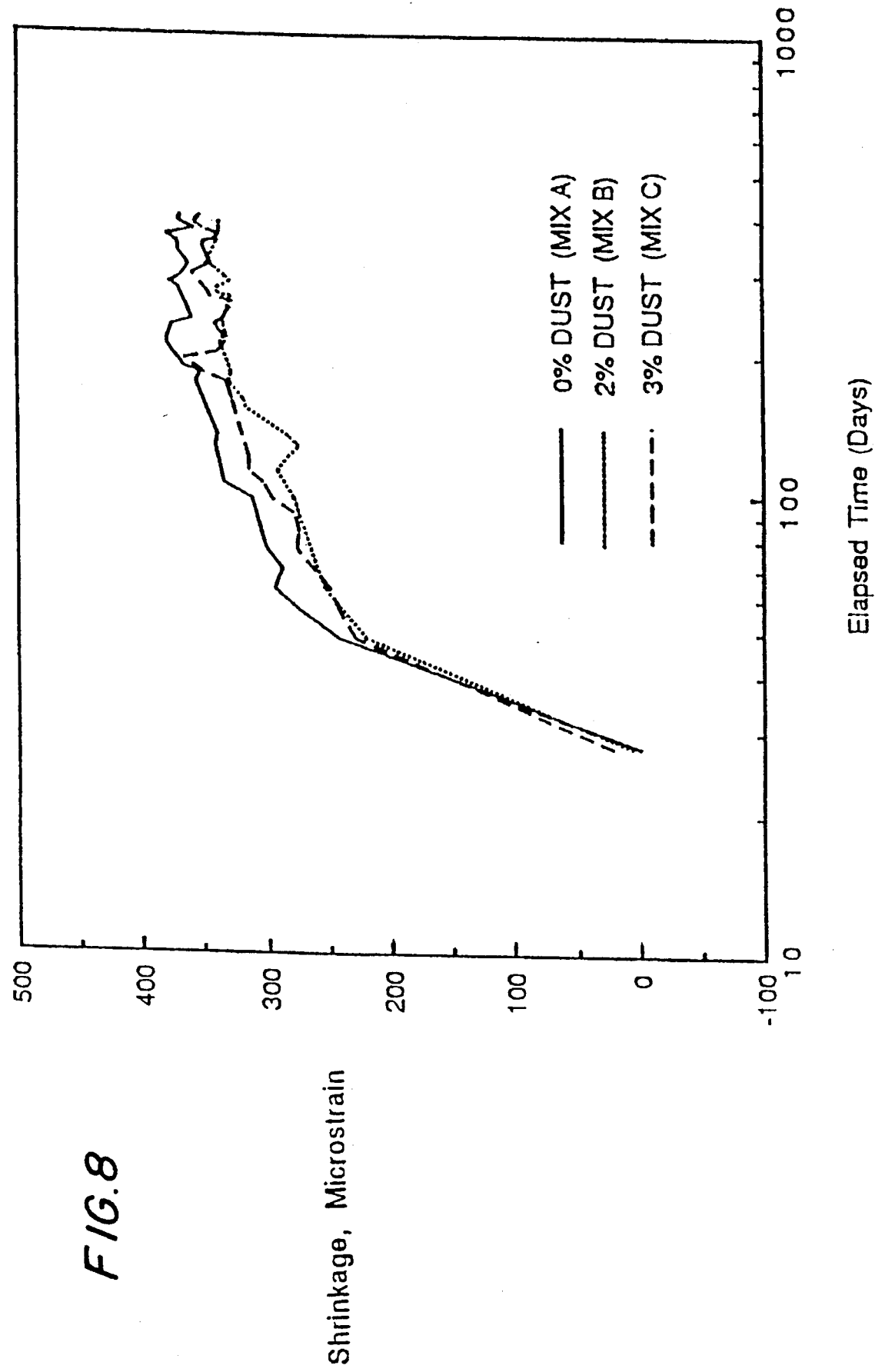
FIG. 8 illustrates the same HCP (half cell potential) data for a number of test specimens but in a different corrosion inducing medium.

The HCP results are shown in FIG. 8 and the RP results along with the $E_{corr}$ are given in Table 14.

TABLE 14

| | RP values for all mixes cured for 28 days and unexposed to sodium chloride solution | | | |
|---|---|---|---|---|
| | RP ohm · cm$^2$ | | $E_{corr}$ mV | |
| Mix | 68 days | 139 days | 68 days | 139 days |
| A | 83359 | 79237 | −71.3 | −8.7 |
| B | 67010 | 67781 | −215.7 | −62.7 |
| C | 67368 | 65156 | −189.3 | −68.7 |

The results indicate that the specimens with BHD (mixes B and C) have more potential for corrosion to occur. As described above this is expected. However, if the specimens are exposed to sodium chloride solution a trend similar to what was shown in FIG. 7 will occur.

Permeability

Permeability is an important property with regard to durability of concrete. It represents the ease with which water (or other fluids) can move through concrete, thereby transporting aggressive agents. It is therefore a very important property in the deterioration of concrete structures due to corrosion and sulfate attack.

There is no single standard test used to measure permeability. In the literature, variety of test procedures have been used to characterize permeability of concrete. These procedures included conventional steady-state flow tests for air and water permeability, as well as novel, more rapid, test methods.

The Figg methods are low-pressure rapid tests to measure air and water permeability of concrete. The methods are based on the concept of drilling a hole from the surface of concrete, plugging the outermost part of the hole with specially molded silicone rubber plug leaving a sealed void 20 mm high×10 mm diameter. A hypodermic needle pressed through the rubber plug is used to make an airtight contact with the sealed void.

In the air permeability test, a vacuum is created inside the sealed hole and the time required for the pressure to drop from 55 kPa to 50 kPa is called Figg No. for air permeability and is taken as a measure of the air permeability of concrete.

In the water permeability test, a water pressure head is created and the time required for the head to drop certain distance is called Figg No. for water permeability and is taken as a measure of the water permeability of concrete.

Both methods are only useful for comparative studies.

A preliminary investigation of the test procedure has revealed that the change in Figg No. over time is due to the change in the moisture content of the specimens. For this reason, the test procedure adapted was as follows:

1. Cure the specimens in a water tank for 28 days after demolding.

2. After 28 days, transfer the specimens to drying condition C2.
3. Leave the specimens to dry in C2 until they reach the age of 90 days.
4. Take permeability measurements at the age of 90 days.
5. Transfer the specimens to an oven and dry at 110 degrees centigrade for 6 days to remove all moisture from them.
6. Take permeability measurements again on the specimens.

The procedure adapted also eliminates the variability which exists between specimens from the same mix since the same specimens are used for both C2 and oven dry conditions.

In this test, 3 slabs 300×300×100 mm were cast for each mix. The dust percentages used in this test were 0, 1, 2, 3, 4 and 5% covering a wider range of dust use than the other tests. The reason for this is to establish a curve with enough points after the recommended dosage of bag house dust.

After casting, all specimens were covered with wet burlap and polyethylene sheets and exposed to atmosphere. Demolding of slabs was done after 72 hours to insure that specimens from all mixes had sufficient time to set. After demolding specimens were transferred to a water tank and kept there until the age of 28 days. After that specimens were removed from the water tank and placed to dry under condition C2 until they were 90 days old. Permeability measurements were taken at the age of 90 days.

Air permeability was done first since moisture has a large effect on permeability. For each specimen, measurements were taken for three holes and repeated twice for each hole to check the values. In case of one of the holes giving higher or lower values than the other two, a fourth hole was drilled and the measurements were taken. The average was taken excluding the suspect value.

Figure 9:
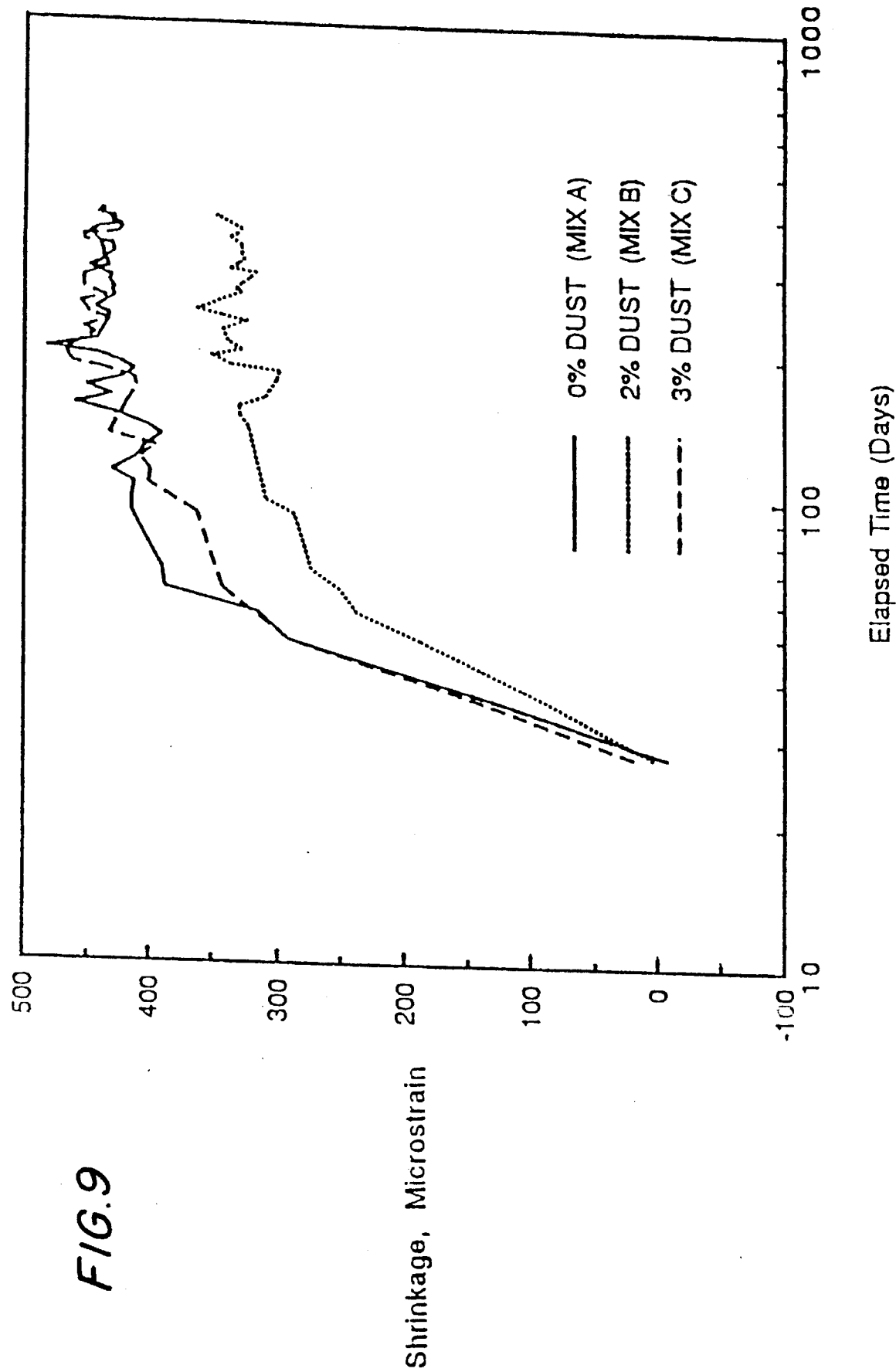
FIG. 9 illustrates air permeability versus bag house dust content for concrete with various percentages of BHD as replacement for cement under specified curing conditions.
Figure 10:
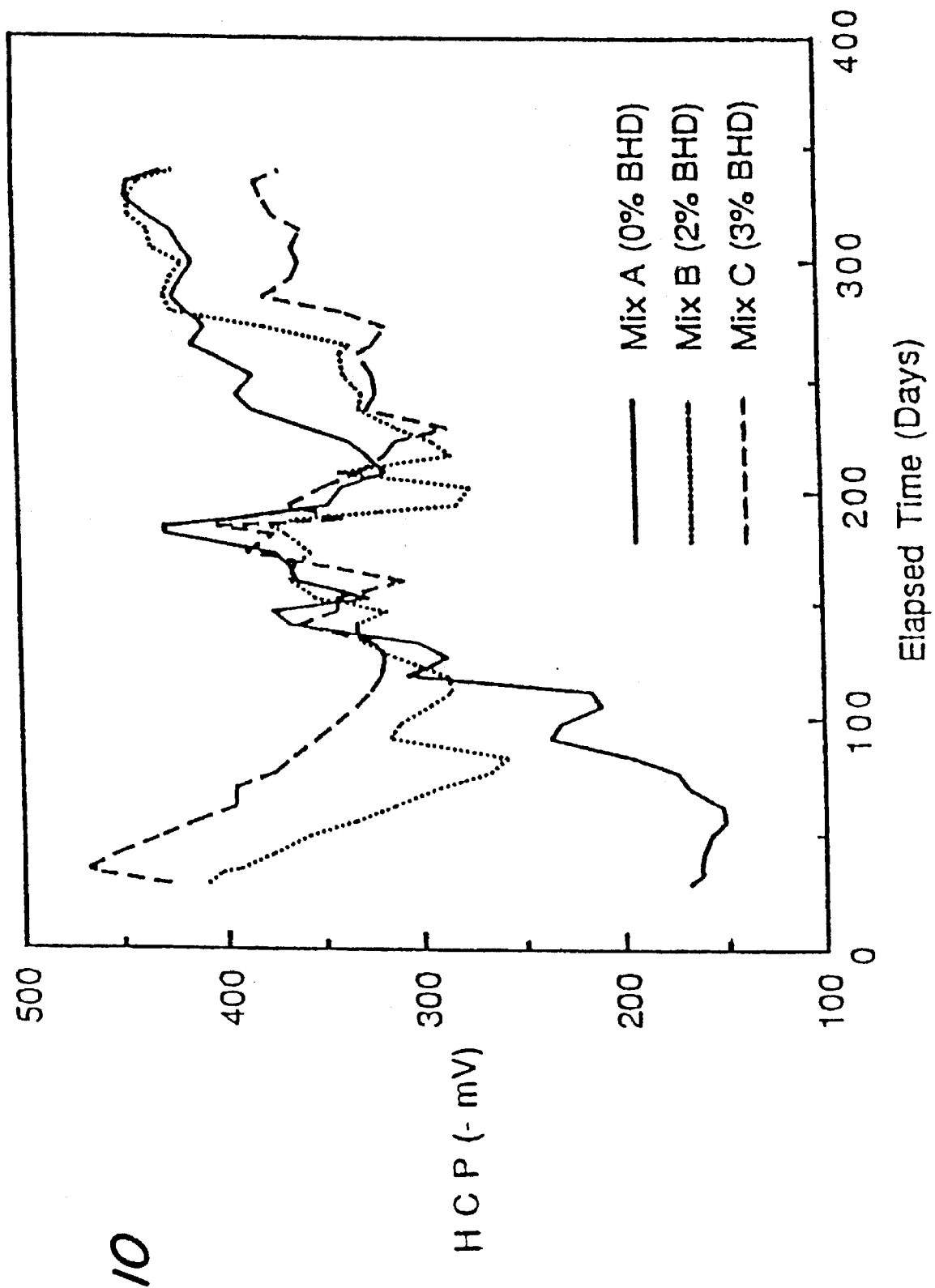
FIG. 10 illustrates water permeability versus bag house dust content for concrete with various percentages of bag house dust as replacement for cement under specified curing conditions.

The results for air and water permeability tests are shown in FIGS. 9 and 10, respectively. For the air permeability, the results show that the dust content, up to 4% improves resistance to permeability. However at 5% dust content, a drastic drop in the Figg No. occurs indicating increased permeability. For the water permeability, the improvement in resistance to permeability with addition of dust is not as clear. However, at 5% dust content a drastic drop in the Figg No. similar to that for air permeability is observed. This decrease in Figg No. indicates the adverse effect of extended set retardation on the permeability of hardened concrete.

Figure 11:
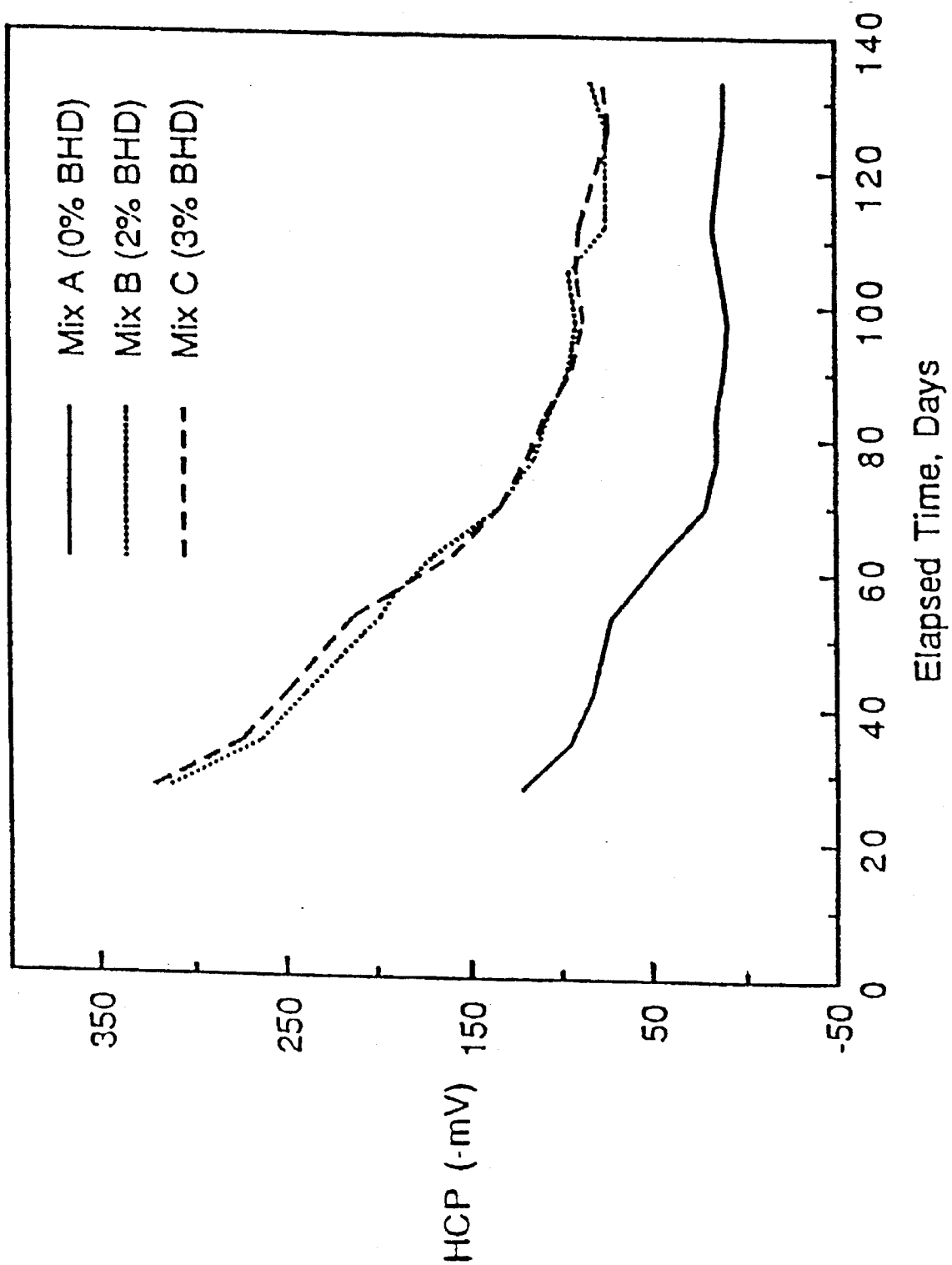
FIG. 11 illustrates air permeability versus bag house dust content for oven dried specimens.
Figure 12:
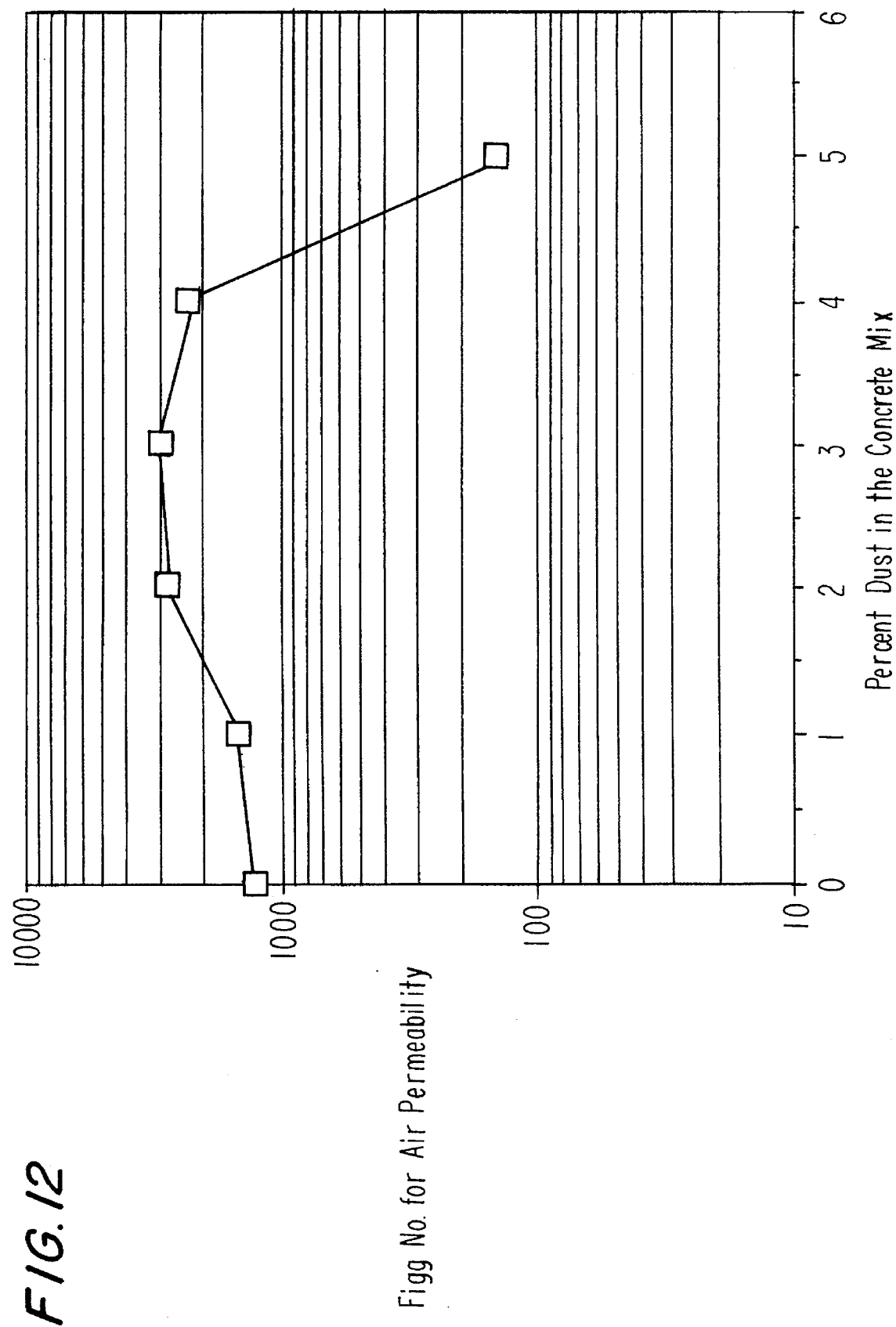
FIG. 12 illustrates water permeability versus bag house dust content for oven dried specimens.

To verify these results further, all slabs were oven dried at 110 degrees centigrade for 6 days to remove moisture. Measurements of air and water permeability on the oven conditioned specimens were taken using newly drilled holes and the results are shown in FIGS. 11 and 12. The results show improved permeability with the addition of bag house dust up to 4%. However, at 5% dust content a drastic drop in the Figg No. is shown. This trend is similar to that observed for lab conditioned specimens.

The results of the permeability investigation show no adverse effect on the permeability of hardened concrete for dust contents up to 4%.

Heat of Hydration

The heat of hydration is the heat generated when cement and water react. The temperature rise resulting from heat of hydration is an important consideration in hot weather and mass (large) concrete construction. The rate and total amount of temperature rise in concrete depend upon two principal factors: (1) the rate of heat generation, and (2) the rate at which the heat is dissipated. For concrete structures not over a few feet thick, the heat is dissipated relatively fast, so that the rate of heat generation is more significant than the total amount. Many variables influence heat generation and its dissipation and therefore affect the temperatures developed in large concrete mass making prediction of the actual temperature rises a complicated problem.

The amount of heat generated within a massive concrete structure is dependent upon the type of cement, the temperature at time of placement, the water-cement ratio, and the cement content.

Adiabatic temperature rise and heat of hydration are not affected by the use of admixture at the same cement content. However, acceleration of retardation may affect the rate of heat generation characteristics which may change the early rate of temperature rise under job conditions.

To investigate the effect of bag house dust on the rate of temperature rise in concrete, three mortar mixes of 1:2.75 cement-to-sand ratio by weight and water/cement ratio of 0.5 were used. The mixes contained 0, 2, and 3% dust replacement of cement to represent the range of bag house dust investigated in this study. Two identical specimens SP1 and SP2 were used for each mix.

The use of cement mortar instead of concrete for this test was the result of trial testing. Its objective was to allow for higher cement content in the mix in order to generate more heat and increase the temperature rise of the test specimens.

Temperature of mortar specimens was monitored using imbedded high accuracy thermistor probes connected to a recording thermometer (RT-meter). The fresh mortar was placed in 7 liter capacity insulated containers fitted with a tight cover to prevent rapid loss of heat for the outside. A single thermistor was imbedded in the center of each of the specimens. The number of specimens was six, two for each mix.

Figure 13:
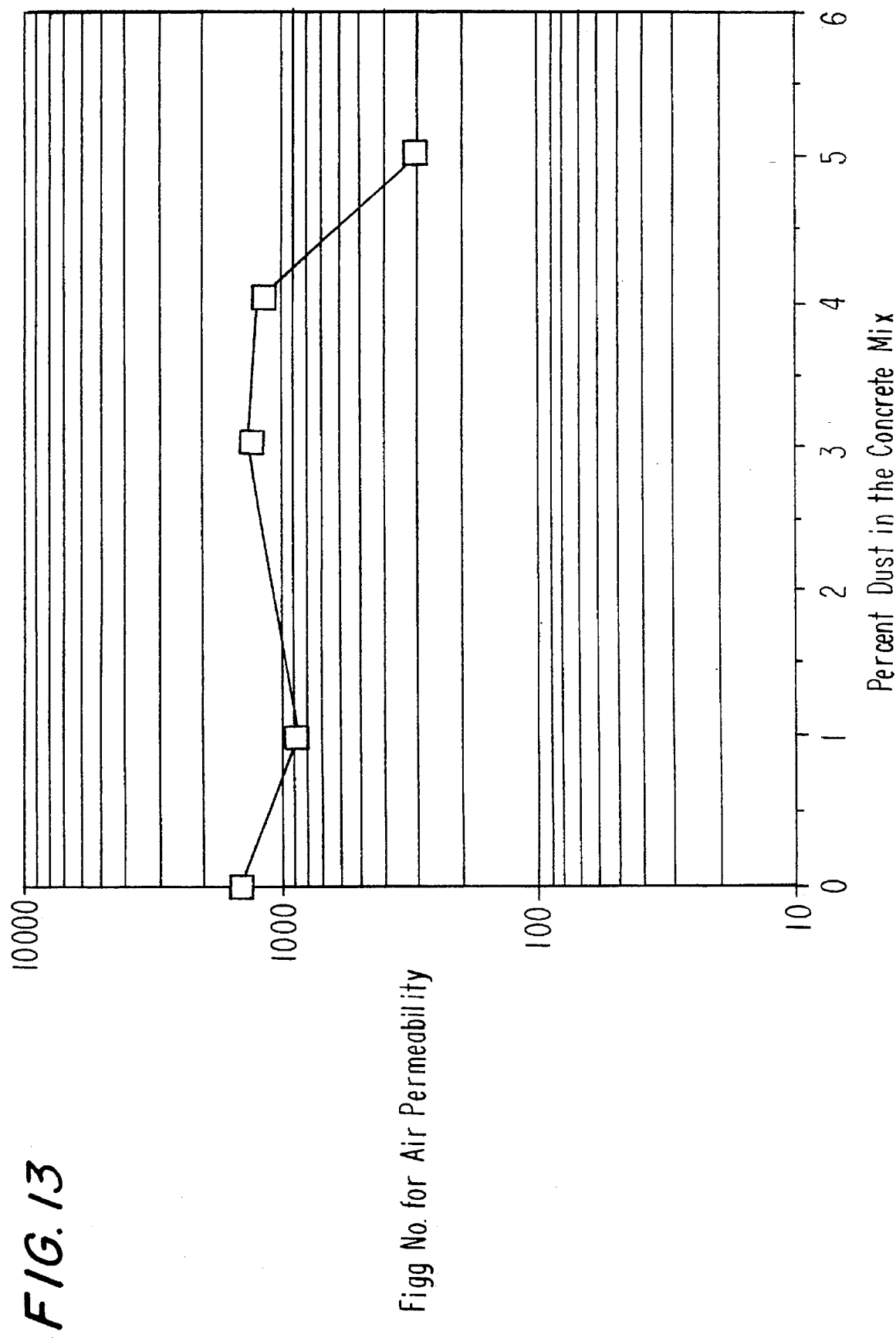
FIG. 13 illustrates a temperature profile during setting in mortar specimens as a function of time for cement not benefitted with bag house dust.

FIG. 13 shows the temperature recordings from the two specimens, SP1 and SP2, containing 0% dust. The results show the rate of temperature rise and the maximum temperature to be almost identical for the same mix. Similar results were observed for the other two mixes confirming that two identical specimens are sufficient.

Figure 14:
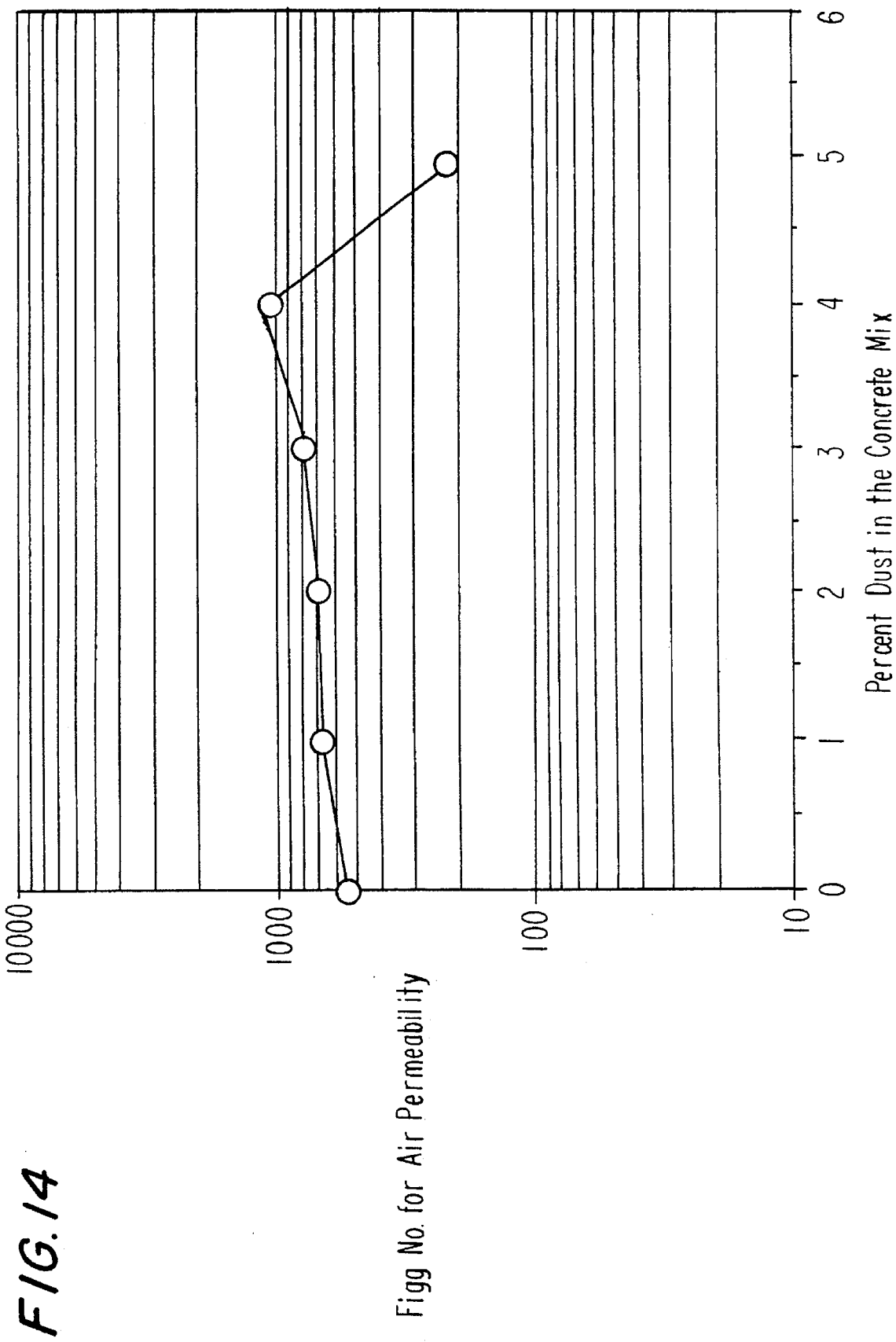
FIG. 14 illustrates a comparison average of temperature profile for bag house dust modified cement in a mortar mixture having 0, 2% and 3% bag house dust additions, respectively.

In FIG. 14, the average temperature profiles from specimens with 0, 2, and 3% dust content are compared. From this figure it is clear that the addition of bag house dust did not affect the temperature profile appreciably.

The peak temperature rise was almost identical for all mortar specimens and was not affected by bag house dust. However, the addition of BHD affected the time to peak temperature drastically. The time to peak temperature was found to be 10, 24 and 54 hours for dust contents of 0, 2 and 3%, respectively. The effect of the BHD on the time to peak temperature is due to the retarding effect of the dust.

As shown by the test results, the EAF dust addition as a replacement for cement in a concrete precursor mixture improves the properties of the end result, i.e., the concrete structure formed. The amount of EAF dust addition may be from about 1.5% to 3% or even up to 4% or more but more desirably from 1.5% to 2% by weight on the same basis. Higher amounts tend to retard set time unduly but appropriate applications may be found where long set retardation is also necessary.

As cement in the present combination, Type I Portland cement is desirable. Other Portland cement types which may be employed are: Type II, Type IV, Type V and any blended cements which do not exhibit fast or slow setting times.

Typical aggregates that have been used are those employed in the concrete industry and their weights and proportions are well known to those skilled in the art.

As EAF dust not only may the raw dust be employed but also EAF dust components from which metals other than zinc have been removed. It is important to mention that the set retardation experienced by concrete made with EAF dust is due to the zinc present in the dust. The dust samples used had approximately 10% by weight zinc. If more or less zinc is present, then respectively less or more EAF dust should be used to obtain the same effect. The zinc, present as oxide, is also responsible for the corrosion inhibition seen in the test results. Further foundry EAF dust may likewise be utilized as may be wet scrubbed EAF dust. When describing EAF dust it is intended to encompass all of the above source materials and encompass dust from various sources such as scrap furnaces or sponge iron furnaces. However, dust from sponge iron furnaces is preferred. As there is no typical assay of EAF dust all varieties are contemplated but the assays corresponding closest to sponge iron EAF dust (Company D dust) are desirable.

With respect to particle sizes which may be ascribed to the EAF dust, these also typically vary but the size distribution found for dust obtained from sponge iron melting is again desirable as shown in Table 4.

Other benefits which accrue as a result of the invention are best realized when the invention is considered in its entirety as a new combination in which the sub-combination is the cement precursor mixture which includes EAF dust useful in concrete formation.

The invention, however, is also to be considered based on the appended claims in which the various aspects of the invention have been shown.

What is claimed is:

1. In a method for modifying properties when casting cement based concrete or any mortar, the improvement comprising: replacing from about 1% to about 4% by weight of cement in a concrete or mortar precursor mixture with electric arc furnace dust, formulating a cement, electric arc furnace dust, and an aggregate mixture with water to obtain a concrete or mortar precursor mixture, and casting said mixture to obtain concrete or mortar with improved set retardation, and enhanced properties.

2. The method as defined in claim 1 wherein the amount of concrete replaced by bag house dust in said mixture is from 1.5% to about 3% by weight.

3. The method as defined in claim 1 wherein from about 1% to about 3% by weight of cement in a concrete precursor mixture is replaced by electric arc furnace dust.

4. The method as defined in claim 1 wherein from about 1% to about 3% by weight of cement in a mortar precursor mixture is replaced by electric arc furnace dust.

5. The method as defined in claim 1 wherein the cement used is Portland cement Type I, II, IV and V and mixtures thereof.

6. The method as defined in claim 5 wherein the cement is Type I Portland cement.

7. The method as defined in claims 5 or 6, wherein about 1% to 4% by weight of electric arc furnace dust is used as an addition.

8. In a method for disposal of electric arc furnace dust, the improvement comprising replacing up to 4% by weight of cement in a concrete or mortar precursor mixture with electric arc furnace dust and casting said precursor mixture to obtain commercially useful concrete or mortar with improved properties.

* * * * *